US010947434B2

(12) United States Patent
Davis et al.

(10) Patent No.: US 10,947,434 B2
(45) Date of Patent: Mar. 16, 2021

(54) ADDITIVE TO ENHANCE SAG STABILITY OF DRILLING FLUID

(71) Applicant: HALLIBURTON ENERGY SERVICES, INC., Houston, TX (US)

(72) Inventors: Chesnee Lae Davis, Spring, TX (US); Philip Wayne Livanec, Dayton, TX (US); William Walter Shumway, Spring, TX (US)

(73) Assignee: HALLIBURTON ENERGY SERVICES, INC., Houston, TX (US)

( * ) Notice: Subject to any disclaimer, the term of this patent is extended or adjusted under 35 U.S.C. 154(b) by 0 days.

(21) Appl. No.: 16/820,084

(22) Filed: Mar. 16, 2020

(65) Prior Publication Data
US 2020/0216739 A1    Jul. 9, 2020

Related U.S. Application Data

(63) Continuation of application No. 16/081,211, filed as application No. PCT/US2016/029601 on Apr. 27, 2016, now Pat. No. 10,590,323.

(51) Int. Cl.
*C09K 8/035* (2006.01)
*C09K 8/575* (2006.01)
(Continued)

(52) U.S. Cl.
CPC ............... *C09K 8/035* (2013.01); *C09K 8/03* (2013.01); *C09K 8/032* (2013.01); *C09K 8/12* (2013.01);
(Continued)

(58) Field of Classification Search
None
See application file for complete search history.

(56) References Cited

U.S. PATENT DOCUMENTS

| 3,639,233 A | | 2/1972 | Schultz et al. | |
| 5,635,458 A | * | 6/1997 | Lee .......................... | C09K 8/12 507/110 |

(Continued)

FOREIGN PATENT DOCUMENTS

WO    2012085516 A2    6/2012

OTHER PUBLICATIONS

International Search Report and Written Opinion; PCT Application No. PCT/US2016/032086; dated Feb. 9, 2017.

*Primary Examiner* — John J Figueroa
(74) *Attorney, Agent, or Firm* — Polsinelli PC

(57) ABSTRACT

A method including providing a drilling fluid that comprises a base fluid, a weighting agent, and a sag stability enhancer, wherein the sag stability enhancer comprises polyethylene glycol (PEG) having a molecular weight of greater than or equal to about 200 g/mol; and placing the drilling fluid in a subterranean formation via a wellbore penetrating the subterranean formation. A method including forming a fluid comprising a base fluid, a weighting agent, and from about 0.5 ppb (1.4 kg/m$^3$) to about 30 ppb (85.5 kg/m$^3$) of a sag stability enhancer, wherein the sag stability enhancer comprises a glycol; and introducing the fluid into at least a portion of a well. A drilling fluid containing a base fluid, a weighting agent, and a sag stability enhancer comprising polyethylene glycol (PEG) having a molecular weight of greater than or equal to about 200 g/mol.

10 Claims, 1 Drawing Sheet

(51) Int. Cl.
*C09K 8/502* (2006.01)
*C09K 8/565* (2006.01)
*C09K 8/57* (2006.01)
*C09K 8/03* (2006.01)
*C09K 8/504* (2006.01)
*C09K 8/506* (2006.01)
*C09K 8/12* (2006.01)
*C09K 8/36* (2006.01)

(52) U.S. Cl.
CPC ............... *C09K 8/36* (2013.01); *C09K 8/502* (2013.01); *C09K 8/506* (2013.01); *C09K 8/5045* (2013.01); *C09K 8/565* (2013.01); *C09K 8/572* (2013.01); *C09K 8/575* (2013.01)

(56) References Cited

U.S. PATENT DOCUMENTS

| | | | | |
|---|---|---|---|---|
| 5,904,208 | A | * | 5/1999 | Ray .......................... C09K 8/52 166/270.1 |
| 5,942,468 | A | * | 8/1999 | Dobson, Jr. .............. C09K 8/36 507/136 |
| 6,196,320 | B1 | * | 3/2001 | Ray .......................... C09K 8/52 166/270.1 |
| 6,291,405 | B1 | * | 9/2001 | Lee .......................... C09K 8/06 507/136 |
| 2013/0096036 | A1 | | 4/2013 | Quintero et al. |
| 2013/0217603 | A1 | | 8/2013 | Jamison et al. |

* cited by examiner

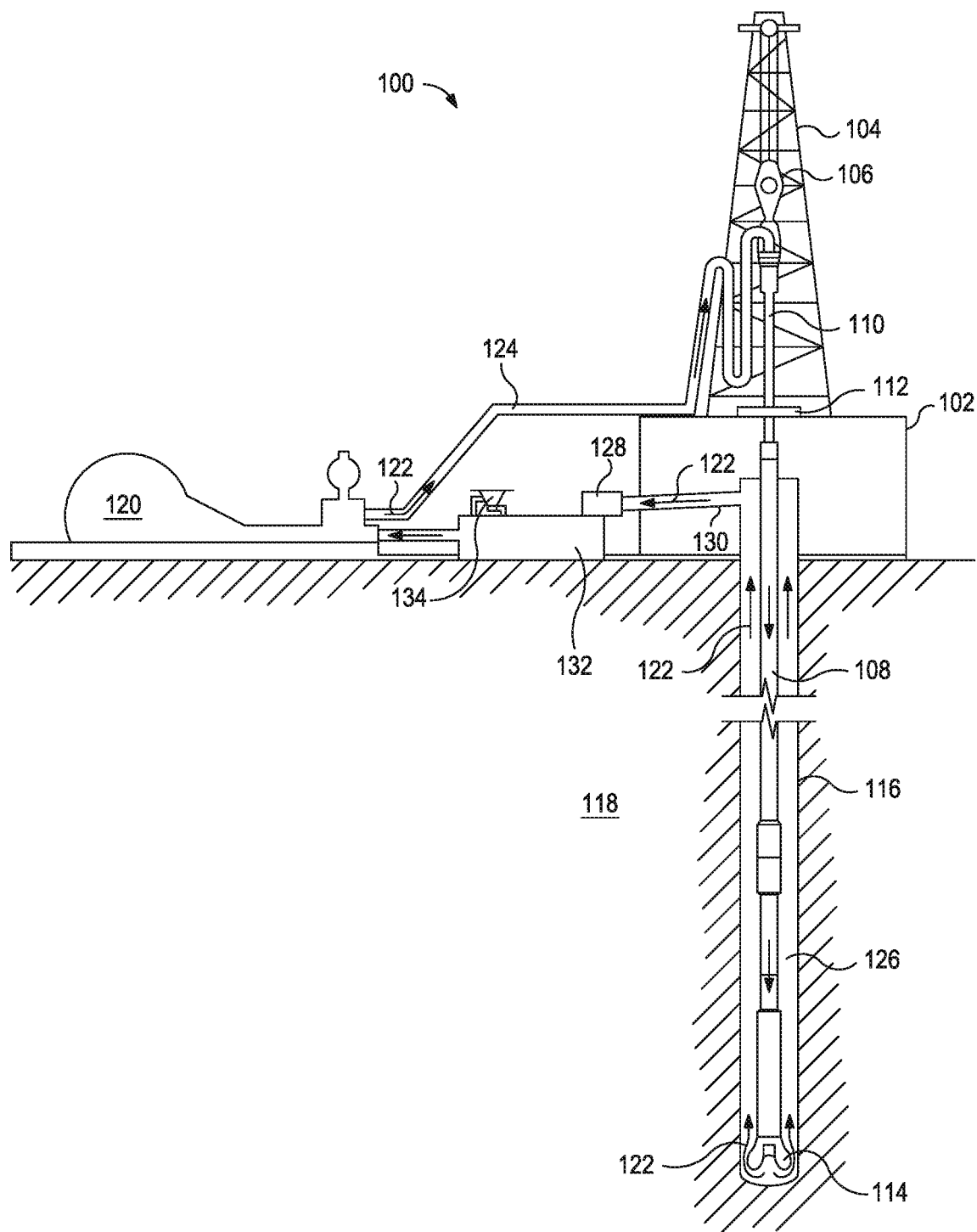

ADDITIVE TO ENHANCE SAG STABILITY OF DRILLING FLUID

CROSS-REFERENCE TO RELATED APPLICATIONS

This application is a divisional application of U.S. application Ser. No. 16/081,211 filed Aug. 30, 2018, which is a national stage entry of PCT/US2016/029601 filed Apr. 27, 2016, each of said applications are expressly incorporated herein in their entirety.

BACKGROUND

The present disclosure generally relates to drilling fluids for use in subterranean applications, and, in particular, drilling fluids having reduced barite sag potential and extended emulsion stability.

A drilling fluid or drilling mud is a designed fluid that is circulated through a wellbore to facilitate a drilling operation. Actions of a drilling fluid can include, without limitation, removing drill cuttings from the wellbore, cooling and lubricating the drill bit, aiding in the support of the drill pipe and the drill bit, and providing a hydrostatic head to maintain integrity of the wellbore walls and preventing blowouts from occurring.

It is often desirable to change the density of a drilling fluid to maintain pressure balance within a wellbore and keep the wellbore stable. Changing the density is usually accomplished by adding a weighting agent to the drilling fluid. Often, the weighting agent is barite (barium sulfate), sometimes spelled baryte. Barite is an insoluble material, and additional stabilizers are usually added to the drilling fluid to maintain the salt in a suspended state. Stabilizers can include, for example, thickeners, viscosifying agents, gelling agents and the like. Use of stabilizers can be problematic if they increase the viscosity of the drilling fluid so much that effective pumping into the wellbore becomes difficult.

In lower viscosity drilling fluids, even in the presence of added stabilizers, barite can begin to settle from the drilling fluid in a condition known as "barite sag." Other solid weighting agents can also experience sag. As used herein, the term "barite sag" refers to a settling of barite or other solid weighting agent in a drilling fluid. Barite sag is undesirable because it can lead to an uneven fluid density in the wellbore and altered well performance. Barite sag can be particularly problematic in cases where the drilling fluid cannot be effectively sheared before being pumped downhole. For example, barite sag can occur during transport of a drilling fluid to an offshore drilling platform. In other instances, barite sag can occur downhole when the drilling fluid spends a longer than usual time downhole or there are inadequate downhole shearing forces. In extreme cases, barite sag can deposit a bed of barite on the low side of the wellbore, eventually leading to stuck pipe and possible abandonment of the wellbore.

The difference in a drilling fluid's surface density at the well head and the density while pumping or circulating downhole is typically referred to as the equivalent circulating density (ECD). Several drilling fluids having low ECDs have been developed that contain organophilic clay or organolignite additives. As used herein, the term "organophilic clay" refers to clays that have been treated with a cationic surfactant (e.g., a dialkylamine cationic surfactant or a quaternary ammonium compound) or like surface treatments. Organolignite additives have been prepared in a like manner. Organophilic clays typically swell in non-polar organic solvents, thereby forming open aggregates that are believed to be a suspending structure for barite and other solid weighting agents in invert emulsion drilling fluids containing these agents. Although such additives are effective at mediating barite sag in many cases, exposure of organophilic clays, in particular, to drill cuttings can alter the performance of the drilling fluid. For example, organophilic clays may prevent the formation of ideal or near ideal thixotropic fluids that are initially viscous but then thin at a later time. Incorporation of drill cuttings often increases the fluid viscosity dramatically, and organophilic additives have a tendency to create a robust gel structure under static conditions that may be difficult to break when reestablishing circulation. This may lead to high ECD pressure spikes (and concomitantly poor cement jobs) when circulation is restarted.

Drilling fluids not containing organophilic clays or organolignite additives can have emulsion structures that are sensitive to low concentrations of solids therein. In these cases, a minimum concentration of solids can be required to achieve adequate emulsion stability over time. Many drilling applications rely upon the downhole introduction of solids into the drilling fluid in the form of drill cuttings in order to stabilize the drilling fluid's emulsion structure. In these cases, the introduction of ~2-3% drill cutting solids is typically considered necessary to maintain downhole emulsion stability. Although downhole introduction of drill cutting solids provides satisfactory performance in many cases, there are notable exceptions when this is not the case. In some instances, drilling operations may not incorporate sufficient amounts of drill cutting solids into the drilling fluid to achieve satisfactory emulsion stability. In other instances, the drill cutting solids may not be of the correct type to achieve satisfactory emulsion stability. For example, sand formations and salt formations can provide drill cutting solids that fail to satisfactorily stabilize the drilling fluid's emulsion structure. In still other instances, the drilling fluid may experience significant sag during delivery to a drilling site.

Sag stability of drilling fluids is a growing concern, as drilling wellbores becomes more challenging, e.g., drilling of deviated wellbores and high pressure/high temperature (HPHT) environments. Generally, the hotter temperatures encountered during drilling, the greater the likelihood of barite sag, and the deeper the drilling environment, the narrower the ECD window may be. The ECD window is the pressure difference between the pore pressure and the fracture gradient, or the window the ECD has to stay within to avoid a "kick" of formation fluids and/or a fracturing of the formation. Low ECD drilling fluids require a low viscosity while maintaining suspension properties of the drilling fluid to reduce or eliminate the occurrence of sag. Instances of sag instability increase the likelihood of losing wellbore control, possibly either fracturing the wellbore or taking a kick. Accordingly, an ongoing need exists for drilling fluids with enhanced sag stability.

BRIEF DESCRIPTION OF THE DRAWINGS

The following figures are included to illustrate certain aspects of the present disclosure, and should not be viewed as exclusive embodiments. The subject matter disclosed is capable of considerable modification, alteration, and equivalents in form and function, as will occur to one having ordinary skill in the art and having the benefit of this disclosure.

FIG. 1 depicts an embodiment of a system configured for delivering the enhanced sag stability drilling fluid of embodiments described herein to a downhole location.

DETAILED DESCRIPTION

The present disclosure provides a drilling fluid for use in subterranean applications, said drilling fluid having enhanced sag stability, and also provides methods of use of such drilling fluids.

Herein disclosed is a method comprising: providing a drilling fluid that comprises a base fluid; a weighting agent; and a sag stability enhancer, wherein the sag stability enhancer comprises polyethylene glycol (PEG) having a molecular weight of greater than or equal to about 200 g/mol; and placing the drilling fluid in a subterranean formation via a wellbore penetrating the subterranean formation. In embodiments, the PEG has a molecular weight in the range of from about 200 to about 20,000 g/mol. In embodiments, the drilling fluid comprises less than about 30 ppb (85.5 kg/m$^3$) of the sag stability enhancer. In embodiments, the drilling fluid comprises from about 0.5 ppb (1.4 kg/m$^3$) to about 20 ppb (57.0 kg/m$^3$) of the sag stability enhancer. In embodiments, the weighting agent comprises barite. In embodiments, the weighting agent has a $d_{50}$ of less than or equal to about 25 µm. In embodiments, the base fluid is selected from the group consisting of oil based fluids. The drilling fluid may comprise a low ECD fluid, designed to add less than about 1.5 ppg (180 kg/m$^3$) density change due to circulation in the wellbore. In embodiments, the drilling fluid has a density in the range of from about 9 ppg (1080 kg/m$^3$) to about 18 ppg (2160 kg/m$^3$). In embodiments, the drilling fluid is in the form of an invert emulsion. In embodiments, the base fluid is a water-based fluid.

In embodiments, the drilling fluid exhibits a density change after static aging for at least 120 hours that is at least about 60% less than that of the same drilling fluid absent the sag stability enhancer. In embodiments, the drilling fluid has a density that changes by less than about 5% over at least 120 hours of static aging. In embodiments, the drilling fluid, when compared to a same drilling fluid without the sag stability enhancer, restricts the increase in plastic viscosity to about 25% or less, and has at least one characteristic selected from the group consisting of: an increased yield point, a reduced density change upon static aging, a reduced sag factor upon static aging, and combinations thereof. Placing the drilling fluid in a subterranean formation via a wellbore penetrating the subterranean formation may further comprises subjecting the drilling fluid to a temperature of greater than at least about 300° F. (148.9° C.) for a time period of at least 120 hours.

Also disclosed herein is a method comprising: forming a fluid comprising a base fluid; a weighting agent; and from about 0.5 ppb (1.4 kg/m$^3$) to about 30 ppb (85.5 kg/m$^3$) of a sag stability enhancer, wherein the sag stability enhancer comprises a glycol; and introducing the fluid into at least a portion of a well. In embodiments, the fluid has a density that changes by less than about 5% over at least 120 hours of static aging. In embodiments, the sag stability enhancer comprises polyethylene glycol having a molecular weight in the range of from about 200 to about 20,000 g/mol. In embodiments, the weighting agent comprises barite, and the barite has a $d_{50}$ of less than or equal to about 25 µm. In embodiments, the fluid is an oil-based drilling fluid. In embodiments, the fluid is in the form of an invert emulsion, and is designed to add less than about 1.5 ppg (180 kg/m$^3$) density change due to circulation. In embodiments, the fluid, when compared to a same drilling fluid without the sag stability enhancer, restricts the increase in plastic viscosity to about 25% or less, and has at least one characteristic selected from the group consisting of: an increased yield point, a reduced density change upon static aging, a reduced sag factor upon static aging, and combinations thereof. The base fluid may be a water-based fluid.

Also disclosed herein is a drilling fluid comprising: a base fluid; a weighting agent; and a sag stability enhancer comprising polyethylene glycol (PEG) having a molecular weight of greater than or equal to about 200 g/mol. In embodiments, the PEG has a molecular weight in the range of from about 200 to about 20,000 g/mol. The drilling fluid may comprise less than about 30 ppb (85.5 kg/m$^3$) of the sag stability enhancer. The drilling fluid may comprise from about 0.5 ppb (1.4 kg/m$^3$) to about 20 ppb (57.0 kg/m$^3$) of the sag stability enhancer. In embodiments, the weighting agent comprises barite. In embodiments, the weighting agent comprises barite having a $d_{50}$ of less than or equal to about 25 µm.

The base fluid may be selected from the group consisting of oil based fluids. The drilling fluid may be in the form of an invert emulsion. In embodiments, the drilling fluid comprises a low ECD fluid designed to add less than about 1.5 ppg (180 kg/m$^3$) density change due to circulation. In embodiments, the drilling fluid has a density in the range of from about 9 ppg (1080 kg/m$^3$) to about 18 ppg (2160 kg/m$^3$). In embodiments, the base fluid is a water-based fluid. In embodiments, the drilling fluid exhibits a density change after static aging for at least 120 hours that is at least about 60% less than that of the same drilling fluid absent the sag stability enhancer. In embodiments, the drilling fluid has a density that changes by less than about 5% over at least 120 hours of static aging. In embodiments, the drilling fluid, when compared to a same drilling fluid without the sag stability enhancer, restricts the increase in plastic viscosity to about 25% or less, and has at least one characteristic selected from the group consisting of: an increased yield point, a reduced density change upon static aging, a reduced sag factor upon static aging, and combinations thereof.

General Measurement Terms

Unless otherwise specified or unless the context otherwise clearly requires, any ratio or percentage means by weight.

If there is any difference between U.S. or Imperial units, U.S. units are intended.

If all that is needed is to convert a volume in barrels to a volume in cubic meters without compensating for temperature differences, then 1 bbl equals 0.159 m$^3$ or 42 U.S. gallons.

Unless otherwise specified, mesh sizes are in U.S. Standard Mesh.

The micrometer (µm) may sometimes be referred to herein as a micron.

The conversion between pound per gallon (lb/gal or ppg) and kilogram per cubic meter (kg/m$^3$) is: 1 lb/gal=(1 lb/gal)×(0.4536 kg/lb)×(gal/0.003785 m$^3$)=120 kg/m$^3$.

The conversion between pound per barrel (lb/bbl or ppb) and kilogram per cubic meter (kg/m$^3$) is: 1 lb/bbl=(1 lb/bbl)×(0.4536 kg/lb)×(bbl/0.159 m$^3$)=2.85 kg/m$^3$.

The conversion between pound per square foot (lb/ft$^2$) and kilogram per square meter (kg/m$^2$) is: 1 lb/ft$^2$=4.9 kg/m$^2$.

The features and advantages provided by the sag stability enhancer and drilling fluids of this disclosure will be readily apparent to those skilled in the art upon a reading of the following description of the embodiments.

As noted hereinabove, the present disclosure relates to drilling fluids for use in subterranean applications, and, in particular, drilling fluids having reduced sag potential and extended emulsion stability. More specifically, the present disclosure provides, in embodiments, drilling fluids that exhibit desirable rheological properties, with enhanced sag stability, in embodiments enabling the maintenance of low ECDs over extended periods of time. For example, a drilling fluid according to this disclosure may exhibit enhanced sag stability, without a concomitant substantial increase in rheology.

Although the description that follows is primarily directed to drilling fluids containing barite particles, drilling fluids containing like weighting agents can also be stabilized by making use of the present disclosure.

Of the many advantages of the present disclosure, only a few of which are discussed or alluded to herein, the present disclosure generally provides facile methods for drilling wellbores in certain subterranean formations. Drilling fluids according to this disclosure may exhibit improved viscosity, solids suspension, and/or fluid loss control under wellbore conditions (e.g., temperatures up to or above 300° F. (176.7° C.)) for extended periods of time. This is accomplished via drilling fluids that have a reduced potential for barite sag and increased emulsion stability over extended periods of time. Emulsion stability can be reflected in the drilling fluid having a relatively stable density and rheological profile over extended aging times. The drilling fluids of the present disclosure utilize a sag stability enhancer comprising glycol (e.g., polyethylene glycol) to confer extended density stability to the drilling fluid, particularly at downhole temperatures. Density stabilization makes the present drilling fluids desirable for extended downhole use. Without limitation, such density stabilization may be especially desirable in highly deviated wellbores, wellbores having narrow annuli, and wellbores in depleted formations, where the drilling fluids can spend a considerable amount of time downhole. In addition, the density stabilization provided by the sag stability enhancer may allow the present drilling fluids to be transported to a drilling site without density gradients forming in the drilling fluid during transport.

Drilling fluids according to the present disclosure may advantageously be formed via the introduction of the disclosed sag stability enhancer thereto prior to pumping downhole. In this manner, the emulsion structure of the drilling fluid and the distribution of a weighting agent therein may be stabilized. According to embodiments, the introduction of drill cutting solids during a drilling operation and extensive downhole shearing are not necessarily required to stabilize the emulsion while downhole. The earlier introduction of the sag stability enhancer may allow the composition of the drilling fluid to be maintained in a desired range for conferring emulsion stability, while producing a desired rheological performance over extended periods of time. In addition, the earlier introduction of the sag stability enhancer may allow the drilling fluid to be pumped downhole without necessarily applying shear prior to or during the pumping operation in order to redisperse a weighting agent. Accordingly, in embodiments, a drilling fluid according to this disclosure can be formulated at a production facility, sheared and then transported to a drilling site for downhole pumping.

An additional advantage of the drilling fluids according to embodiments of this disclosure is that the sag stability enhancer is present in an amount that is sufficient to confer extended density stability to the drilling fluid without substantially degrading its rheological performance compared to a drilling fluid not containing the sag stability enhancer. Thus, drilling fluids according to this disclosure remain very amenable to downhole pumping and demonstrate desirable downhole performance characteristics. In addition, the incorporation of the sag stability enhancer into the drilling fluids of this disclosure can result in certain beneficial rheological enhancements, as further discussed herein below.

It has been conventional in the art to simulate downhole performance of a drilling fluid through static aging of a drilling fluid sample under conditions comparable to those experienced downhole. By monitoring the drilling fluid sample's rheological performance and density as a function of time under simulated downhole conditions, an indicator of downhole performance and sag potential can be ascertained. Typically, it has been conventional to conduct these measurements after 16 hours of static aging. This period of time has been considered by those of ordinary skill in the art to be sufficiently indicative of the long term density stability and rheological performance of the drilling fluid while downhole. However, some drilling fluids that exhibit acceptable performance at 16 hours of aging may exhibit substantially different density and rheological profile at more extended aging times (e.g., up to 120 hours). Therefore, a drilling fluid that might seem suitable for downhole use based on the 16-hour aging data might, in fact, be unacceptable during extended downhole residence times. Drilling fluids according to this disclosure containing a sag stability enhancer as provided herein advantageously provide relatively stable densities and good rheological performance over extended periods of time, which may make them quite desirable for certain downhole operations.

To determine if a drilling fluid exhibits enhanced sag stability, sag testing and rheological performance testing may be performed as described in the Examples hereinbelow. In general, enhanced sag stability is found to exist if the density of the bottom 25% of drilling fluid increases by less than about 10% of the base fluid density. The percent change is over at least about 120 hours of static aging and/or if the low shear rheological profile of the drilling fluid changes by less than about ±25%, as measured by the dial reading at a rotation rate of 6 revolutions per minute (rpm) or less on a Fann Model 35 Viscometer. Drilling fluids having these qualities are presented in the Examples hereinbelow.

The present disclosure describes methods using drilling fluids according to this disclosure. In some embodiments, the methods comprise providing a drilling fluid comprising a base fluid, a weighting agent, and a sag stability enhancer according to this disclosure, and placing the drilling fluid in a subterranean formation via a wellbore penetrating the subterranean formation. Although referred to herein as a 'drilling' fluid, it is to be understood that the sag stability enhancer according to this disclosure may be suitable for a variety of fluids utilized in a wellbore, such as, without limitation, fluids utilized for drilling, completion and stimulation operations (such as fracturing, running casing liners), sand control treatments such as installing gravel pack, cementing, maintenance and reactivation.

Sag Stability Enhancer

A drilling fluid according to this disclosure comprises a sag stability enhancer. The sag stability enhancer comprises glycol. In embodiments, the sag stability enhancer comprises one or more of ethylene glycol, diethylene glycol, triethylene glycol, propylene glycol, butylene glycol, polyethylene glycol (also referred to herein as 'PEG'), polypropylene glycol, polyethylene-propylene glycol, and the like. In embodiments, the sag stability enhancer comprises a water soluble glycol, which herein refers to a glycol that is miscible with fresh water at 20° C. In embodiments, the sag stability enhancer comprises a preferentially oil-soluble glycol, which herein refers to a glycol which at 20° C. is miscible at all proportions with oil but has limited miscibility with water, specifically less than 10% by volume of the glycol is miscible with fresh water, such that the addition of greater than 10% by volume of the glycol mixed with fresh water results in two phases.

In embodiments, the sag stability enhancer comprises at least one component having the formula $H(OCH_2CH_2)_nOH$. In embodiments, n is greater than or equal to 4. In embodiments, the glycol is polyethylene glycol. In embodiments, the sag stability enhancer comprises PEG having an average molecular weight of greater than or equal to about 200, 250, 300, 350, 400, 450, 500, 550, or 600 grams per mole (g/mol). In embodiments, the sag stability enhancer comprises PEG having an average molecular weight of less than about 250, 300, 350, 400, 450, 500, 550, or 600 grams per mole (g/mol). In embodiment, the PEG has an average molecular weight in the range of from about 200 to about 20,000 g/mol. In embodiments, the PEG has an average molecular weight in the range of from about 200 to about 10,000 g/mol. In embodiments, the PEG has an average molecular weight in the range of from about 200 to about 1,000 g/mol. In embodiments, the sag stability enhancer comprises at least one glycol that is liquid at room temperature and pressure. In embodiments, the PEG has an average molecular weight in the range of from about 200 to about 600 g/mol. In embodiments, the PEG has an average molecular weight in the range of from about 200 to about 500 g/mol. In embodiments, the PEG has an average molecular weight in the range of from about 200 to about 400 g/mol. In embodiments, the PEG has an average molecular weight in the range of from about 200 to about 300 g/mol. In embodiments, the PEG has an average molecular weight in the range of from about 200 to about 250 g/mol. In embodiments, the sag stability enhancer comprises at least one glycol that is solid or semisolid at room temperature and pressure. In embodiments, the sag stability enhancer comprises monodisperse PEG. In embodiments, the sag stability enhancer comprises polydisperse PEG.

A drilling fluid according to this disclosure may comprise an amount of sag stability enhancer suitable to enhance the sag stability sufficiently for a given application. It will be apparent to one of skill in the art, upon reading this disclosure, how to determine such a suitable amount of sag stability enhancer. However, in embodiments, a drilling fluid according to this disclosure may contain from about 0.5 pounds per barrel (ppb or lb/bbl) to about 30 ppb (from about 1.4 kg/m$^3$ to about 85.5 kg/m$^3$), from about 0.5 ppb to about 20 ppb (from about 1.4 kg/m$^3$ to about 57.0 kg/m$^3$), from about 0.5 ppb to about 10 ppb (from about 1.4 kg/m$^3$ to about 28.5 kg/m$^3$), from about 1 ppb to about 10 ppb (from about 2.85 kg/m$^3$ to about 28.5 kg/m$^3$), or from about 2 ppb to about 6 ppb (from about 5.7 kg/m$^3$ to about 17.1 kg/m$^3$) of the sag stability enhancer. In embodiments, a drilling fluid according to this disclosure contains greater than or equal to about 0.5, 1, 2, 3, 4, or 5 ppb (greater than or equal to about 1.4, 2.85, 5.7, 8.6, 11.4, or 14.2 kg/m$^3$) of the sag stability enhancer. In embodiments, a drilling fluid according to this disclosure contains less than or equal to about 30, 25, 20, 15, 10, 9, 8, 7, 6, 5, 4, 3, or 2 ppb (less than or equal to about 85.5, 71.3, 57.1, 42.8, 28.5, 25.7, 22.8, 20.0, 17.1, 14.2, 11.4, 8.6, or 5.7 kg/m$^3$) of the sag stability enhancer.

Weighting Agent

Drilling fluids according to this disclosure comprise a weighting agent. In embodiments, the weighting agent is present to produce a desired density in a drilling fluid according to this disclosure. In embodiments, the weighting agent comprises barite particles. Weighting agents other than barite can be used in any of the embodiments described herein. In some embodiments, weighting agents such as, by way of non-limiting example, hematite, magnetite, iron oxides, illmenite, siderite, celestite, dolomite, olivine, calcite, magnesium oxides, halites and the like can be used. In some embodiments, weighting agents such as calcium carbonate, strontium sulfate, or manganese tetraoxide can be used. Other weighting agents can also be envisioned by those of ordinary skill in the art.

In embodiments, incorporation of the sag stability enhancer of this disclosure enables the use of more economical weighting agent. For example, by way of non-limiting example, a drilling fluid according to this disclosure may contain larger barite particles than would be suitable in a drilling fluid absent the disclosed sag stability enhancer. Generally, particles that are overly large might settle/sag, while overly fine particles may not provide adequate weighting, may be more expensive to obtain because of the grinding involved, and may tend to cause an increase in fluid loss relative to the same volume of larger particles. However, by Stokes law, smaller particles settle slower and hence have inherently higher sag resistance. The enhanced sag stability provided by incorporation of the herein-disclosed sag stability enhancer may enable utilization of larger particles of weighting agent than could be successfully utilized in the same drilling fluid absent the sag stability enhancer. The median particle size, or $d_{50}$, is the diameter above which half of the particles are smaller and half are larger in size. In embodiments, at least 40%, 50%, 60%, 70%, 80%, 90%, or 100% by weight of the barite particles are provided by a barite source having a median particle size ($d_{50}$) of greater than or equal to about 10, 15, 20, 25, 30, 35, 40, 45, or 50 micrometers. In some embodiments, a majority (i.e., greater than 50 weight percent) of the barite particles are provided by a barite source having a median particle size ($d_{50}$) of 15, 20, or 25 microns or more. In embodiments, the weighting agent comprises API barite (discussed further hereinbelow), 325 mesh barite (discussed further hereinbelow), or a combination thereof. The barite may have a specific gravity of greater than or equal to about 4.0, 4.1, 4.2, 4.3, 4.4, or 4.5 g/cm$^3$.

In some embodiments, from about 6% to about 80% of the particles of the weighting agent are 20 microns or larger in size. In embodiments, at least about 30%, 40%, 50%, 60%, 70%, 80%, 90%, or 95% of the particles of the weighting agent are greater than or equal to about 15, 20, 25, 30, or 35 micrometers in size. In some embodiments, at least a portion of the weighting agent used in the present embodiments comprise American Petroleum Institute (API)-barite particles or barite particles having a like size distribution. According to API standards, API barite has a particle size distribution ranging substantially between 3 and 74 microns and a specific gravity of at least 4.20 g/cm$^3$. Table 1 shows a listing of particle size distribution measured in a typical sample of API barite. API barite may have a $d_{50}$ of about 20 μm to 25 μm.

TABLE 1

TYPICAL PSD OF API BARITE

| Size Range, microns | Typical Amount of Particles, % |
|---|---|
| <1 | 0.85 |
| 1-4 | 7.40 |
| 4-8 | 6.25 |
| 8-12 | 5.25 |
| 12-16 | 4.75 |
| 16-20 | 4.50 |
| >20 | 71.00 |
| | 100% |

Although removal of large particles from the barite source advantageously decreases the propensity for barite sag to occur, Applicants have found that incorporation of the sag stability enhancer of this disclosure enables, in embodiments, utilization of larger particles of weighting agent, such as API barite.

In embodiments, a portion of the weighting agent may comprise barite having a reduced $d_{50}$ relative to that of API barite. As a non-limiting example, smaller barite particles can be prepared by grinding API barite or any other barite source and passing the ground barite through a sieve or mesh screen to provide barite particles having a desired size range. For example, in some embodiments, ground barite can be passed through a 325 mesh screen to produce barite particles that are less than 45 microns in size. Other sizing techniques and size ranges may be envisioned by those of ordinary skill in the art. Table 2 shows a listing of particle size distributions in a typical ground barite that can be passed through a 325 mesh screen. Such a 325 mesh barite may have a median particle size or $d_{50}$ of about 10-20 μm.

TABLE 2

TYPICAL PSD OF 325 MESH (0.045 mm) BARITE

| Size Range, microns | Typical Amount of Particles, % |
|---|---|
| <1 | 1.80 |
| 1-4 | 13.70 |
| 4-8 | 15.00 |
| 8-12 | 14.25 |
| 12-16 | 16.25 |
| 16-20 | 14.50 |
| >20 | 24.50 |
| | 100% |

In some embodiments, the weighting agent/barite particles of the present disclosure are substantially spherical. Although certain types of sized barite have been disclosed, one of ordinary skill in the art given the benefit of the present disclosure can appreciate that suitable barite sources having a desired average particle size, density, and/or particle size distribution can be used in the drilling fluids of this disclosure, and selection thereof will depend on the specific application. Desirably, as noted hereinabove, utilization of a sag stability enhancer according to this disclosure will broaden the suitable sources of barite by enhancing the sag stability of a fluid into which it is incorporated.

A drilling fluid according to this disclosure may comprise from about 7 ppb to about 22 ppb, from about 8 ppb to about 20 ppb, or from about 8.5 ppb to about 19 ppb (i.e., from about 19.9 to about 62.7 kg/m³, from about 22.8 kg/m³ to about 57.0 kg/m³, or from about 24.2 kg/m³ to about 54.2 kg/m³) weighting agent.

Base Fluid

Drilling fluids according to this disclosure comprise a base fluid. In embodiments, the drilling fluid is oil based. The oil based fluid may comprise one or more natural and/or synthetic oil based fluid. In embodiments, a drilling fluid according to this disclosure is water based. In embodiments, the drilling fluid is an invert emulsion, which is an oil based emulsion comprising an oleaginous fluid continuous phase and an aqueous fluid internal phase. Such emulsions are commonly referred to as water-in-oil emulsions in which an oil or like non-polar hydrophobic compound forms the continuous phase and water or a water-miscible but oleaginous fluid immiscible compound forms the internal phase. In embodiments, a drilling fluid according to this disclosure comprises an invert emulsion, comprising an oleaginous fluid continuous phase, an aqueous fluid internal phase, and a surfactant.

Oil Base Fluids: As used herein, the term 'oleaginous fluid' refers to a material having the properties of an oil or like non-polar hydrophobic compound. Illustrative oleaginous fluids suitable for use in embodiments of this disclosure include, for example, (i) esters prepared from fatty acids and alcohols, or esters prepared from olefins and fatty acids or alcohols; (ii) linear alpha olefins, isomerized olefins having a straight chain, olefins having a branched structure, isomerized olefins having a cyclic structure, and olefin hydrocarbons; (iii) linear paraffins, branched paraffins, poly-branched paraffins, cyclic paraffins and isoparaffins; (iv) mineral oil hydrocarbons; (v) glyceride triesters including, for example, rapeseed oil, olive oil, canola oil, castor oil, coconut oil, corn oil, cottonseed oil, lard oil, linseed oil, neatsfoot oil, palm oil, peanut oil, perilla oil, rice bran oil, safflower oil, sardine oil, sesame oil, soybean oil and sunflower oil; (vi) naphthenic compounds (cyclic paraffin compounds having a formula of $C_nH_{2n}$ where n is an integer ranging between about 5 and about 30); (vii) diesel; (viii) aliphatic ethers prepared from long chain alcohols; and (ix) aliphatic acetals, dialkylcarbonates, and mixtures thereof. As used herein, fatty acids and alcohols or long chain acids and alcohols refer to acids and alcohols containing about 6 to about 22 carbon atoms, or about 6 to about 18 carbon atoms, or about 6 to about 14 carbon atoms. In some embodiments, such fatty acids and alcohols have about 6 to about 22 carbon atoms comprising their main chain. One of ordinary skill in the art will recognize that the fatty acids and alcohols may also contain unsaturated linkages.

As used herein, the term 'aqueous fluid' refers to a material comprising water or a water-miscible but oleaginous fluid-immiscible compound. Illustrative aqueous fluids suitable for use in embodiments of this disclosure include, for example, fresh water, sea water, a brine containing at least one dissolved organic or inorganic salt, a liquid containing water-miscible organic compounds, and the like.

In embodiments, in a drilling fluid according to this disclosure, an oleaginous fluid continuous phase and an aqueous fluid internal phase are present in a ratio of at least about 50:50. This ratio is commonly stated as the oil-to-water ratio (OWR). That is, in the present embodiments, a drilling fluid having a 50:50 OWR comprises 50% oleaginous fluid continuous phase and 50% aqueous fluid internal phase. In embodiments, drilling fluids according to this disclosure have an OWR ranging between about 50:50 to about 98:2, including all subranges therein between. In embodiments, drilling fluids of this disclosure have an OWR ranging between about 74:26 and about 80:20, including all sub-ranges therein between. In embodiments, the drilling fluids have an OWR of about 75:25 or greater. In embodiments, the drilling fluids have an OWR of about 80:20 or greater. In embodiments, the drilling fluids have an OWR of about 85:15 or greater. In embodiments, the drilling fluids have an OWR between about 90:10 and 60:40, including all subranges there between. One of ordinary skill in the art will recognize that lower OWRs can more readily form emulsions that are suitable for suspending barite and other weighting agents therein. However, one of ordinary skill in the art will also recognize that an OWR that is too low may prove overly viscous for downhole pumping.

A drilling fluid according to this disclosure may contain a surfactant. In general, the surfactant(s) are not particularly limited. In embodiments, the surfactant(s) is present to assist with stabilization of an invert emulsion. Without limitation, illustrative surfactants suitable for use in drilling fluids according to some embodiments of this disclosure include acid hydrolyzable mixed alkyldiethanol amides, alkyl glucosides, polyalkylglucosides, alkylalkoxypolydimethylsiloxanes, polyalkyldimethylsiloxanes, fatty acids, soaps of fatty acids, amido amines, polyamides, polyamines, oleate esters, imidazoline derivatives, oxidized crude tall oil, organic phosphate esters, alkyl aromatic sulfates, alkyl aromatic sulfonates, alkyl sulfates, alkyl sulfonates, monoesters of polyalkoxylated sorbitan, polyester polyols, aliphatic alcohol esters, aromatic alcohol esters, ammonium salts of polyacrylic acid, and ammonium salts of 2-acrylamido-2-methylpropane sulfonic acid/acrylic acid copolymer. In some embodiments, the surfactant is a polyamide. In other embodiments, the surfactant is a fatty acid.

Generally, such surfactants may be present in an amount that does not interfere with the use of the drilling fluids and further facilitates the development of enhanced density stability and rheological properties as described herein. In some embodiments, the surfactants are present in an invert emulsion drilling fluid according to embodiments of this disclosure in an amount less than about 10% by volume of the drilling fluid. In other embodiments, the surfactants are present in invert emulsion drilling fluids according to embodiments of this disclosure in an amount less than about 3% by volume of the drilling fluid.

Aqueous Base Fluids

In embodiments, a drilling fluid according to this disclosure comprises an aqueous base fluid. The aqueous base fluid of the present embodiments can generally be from any source, provided that the fluids do not contain components that might adversely affect the stability and/or performance of the drilling fluids of the present disclosure. In various embodiments, the aqueous base fluid can comprise fresh water, salt water, seawater, brine, or an aqueous salt solution. In some embodiments, the aqueous base fluid can comprise a monovalent brine or a divalent brine. Suitable monovalent brines can include, for example, sodium chloride brines, sodium bromide brines, potassium chloride brines, potassium bromide brines, and the like. Suitable divalent brines can include, for example, magnesium chloride brines, calcium chloride brines, calcium bromide brines, and the like. In some embodiments, the aqueous base fluid can be a high density brine. As used herein, the term 'high density brine' refers to a brine that has a density of about 9.5-10 lbs/gal or greater (1.1 g/cm$^3$-1.2 g/cm$^3$ or greater).

Other Additives: A drilling fluid of this disclosure may optionally comprise any number of additional additives. Examples of such additional additives include, without limitation, gelling agents, fluid loss control agents, corrosion inhibitors, rheology control modifiers or thinners, viscosity enhancers, temporary viscosifying agents, filtration control additives, high temperature/high pressure control additives, emulsification additives, surfactants, acids, alkalinity agents, pH buffers, fluorides, gases, nitrogen, carbon dioxide, surface modifying agents, tackifying agents, foamers, scale inhibitors, catalysts, clay control agents, biocides, bactericides, friction reducers, antifoam agents, bridging agents, dispersants, flocculants, $H_2S$ scavengers, $CO_2$ scavengers, oxygen scavengers, friction reducers, breakers, relative permeability modifiers, resins, particulate materials (e.g., proppant particulates), wetting agents, coating enhancement agents, filter cake removal agents, surfactants, defoamers, shale stabilizers, oils, and the like. One or more of these additives (e.g., bridging agents) may comprise degradable materials that are capable of undergoing irreversible degradation downhole. A person skilled in the art, with the benefit of this disclosure, will recognize the types of additives that may be included in the drilling fluids of the present disclosure for a particular application, without undue experimentation.

As noted above, the sag stability enhancer of the present disclosure may advantageously be incorporated in a drilling fluid according to this disclosure prior to introduction of the drilling fluid in a subterranean formation. Such drilling fluids may be formulated at a production facility and mixed by applying a shearing force to the drilling fluid. Application of the shearing force may result in formation of an emulsion which is stabilized by the sag stability enhancer. Once formed, the emulsion may be stable in the absence of a shearing force, such that the drilling fluids of the present disclosure have a reduced tendency toward barite sag. In embodiments, the sag stability enhancer inhibits and/or reduces sag of the barite particles for at least or equal to about 60, 70, 80, 90, 100, 110, or 120 hours. In embodiments, barite sag inhibition is measured by the drilling fluid having a change in density of less than about 5% over this time period.

In some embodiments, the drilling fluid has a density that changes by less than about 7.5% over at least or equal to about 60, 70, 80, 90, 100, 110, or 120 hours of static aging. In some embodiments, the drilling fluid has a density that changes by less than about 7% over at least or equal to about 60, 70, 80, 90, 100, 110, or 120 hours of static aging. In some embodiments, the drilling fluid has a density that changes by less than about 6% over at least or equal to about 60, 70, 80, 90, 100, 110, or 120 hours of static aging. In some embodiments, the drilling fluid has a density that changes by less than about 5% over at least or equal to about 60, 70, 80, 90, 100, 110, or 120 hours of static aging. In embodiments, the drilling fluid has a density that changes by less than about 4.5% over at least or equal to about 60, 70, 80, 90, 100, 110, or 120 hours of static aging. In embodiments, the drilling fluid has a density that changes by less than about 4% over at least or equal to about 60, 70, 80, 90, 100, 110, or 120 hours of static aging. In embodiments, the drilling fluid has a density that changes by less than about 3% over at least or equal to about 60, 70, 80, 90, 100, 110, or 120 hours of static aging. In still other embodiments, the drilling fluid has a density that changes by an amount between about 1% to about 5%, about 1% to about 4.5%, or about 1% to about 4% over at least or equal to about 40, 50, 60, 70, 80, 90, 100, 110, or 120 hours of static aging. In embodiments, the static aging is at a temperature of greater than or equal to about 300° F. (148.9° C.), 310° F. (154.4° C.), 320° F. (160.0° C.), 330° F. (165.6° C.), 340° F. (171.1° C.), or 350° F. (176.7° C.).

In some embodiments, the acceptable density change of the drilling fluid varies in proportion to the weight of the drilling fluid. For example, for a 14 lb/gal drilling fluid, the change in density of less than about 5% over the time period of static aging may be suitable. However, for heavier drilling fluids, the change in density may desirably be less over the static aging period. For example, for a 16 lb/gal drilling fluid, a suitable change in density may be less than about 4.5% over a given time period of static aging, and for an 18 lb/gal, the change in density may be less than about 4% over that static aging period. In the heavier drilling fluids, such density change values provide the same 0.7 lb/gal variance that occurs for a 14 lb/gal drilling fluid when a 5% change in density occurs. In embodiments, a drilling fluid according to this disclosure exhibits a change in density over a static aging period that is less than or equal to about 2 lb/gal, 1.75 lb/gal, 1.5 lb/gal, 1.25 lb/gal, 1.0 lb/gal, 0.9 lb/gal, 0.8 lb/gal, 0.75 lb/gal, 0.7 lb/gal, 0.6 lb/gal, 0.5 lb/gal, 0.4 lb/gal, 0.3 lb/gal, 0.25 lb/gal, 0.2 lb/gal, or 0.1 lb/gal (i.e., less than or equal to about 240, 210, 180, 150, 120, 108, 96, 90, 84, 72, 60, 48, 36, 30, 24, or 12 kg/m$^3$).

A drilling fluid according to this disclosure may exhibit a density change upon static aging (for example, static aging at 350° F. (167.7° C.) for five days) that is reduced by at least or about 50, 60, 65, 70, or 75% relative to a drilling fluid having the same composition absent the sag stability enhancer.

In embodiments, a drilling fluid according to this disclosure is a low rheology fluid that may provide an ECD increase of less than 1.6, 1.5, 1.4, 1.3, or 1.2 ppg over the static density. In embodiments, a drilling fluid according to this disclosure has a low density or mud weight. Incorporation of a sag stability enhancer according to this disclosure may enable usage of a low mud weight fluid, while inhibiting undesirable barite sag. For example, in embodiments, a drilling fluid according to this disclosure has a formulation density in the range of from about 8 to about 20 ppg (960 to about 2400 kg/m$^3$), from about 8.5 to about 19 ppg (1020 to about 2280 kg/m$^3$), from about 9 to about 18 ppg (1080 to about 2160 kg/m$^3$), or from about 9 ppg to about 17 ppg (1080 to about 2040 kg/m$^3$). In embodiments, a drilling fluid according to this disclosure has a formulation density in the range of from about 8, 9, 10, 11, or 12 ppg to about 15, 16, 17, 18 or 19 ppg (i.e., from about 960, 1080, 1200, 1320, or 1440 kg/m$^3$ to about 1800, 1920, 2040, 2160, or 2280 kg/m$^3$). In embodiments, a drilling fluid according to this disclosure has a formulation density of equal to or about 8, 9, 9.5, 10, 10.5, 11, 11.5, 12, 12.5, 13, 13.5, 14, 14.5, 15, 15.5, 16, 16.5, 17, 17.5, 18, 18.5, 19, 19.5 or 20 ppg (960, 1080, 1140, 1200, 1260, 1320, 1380, 1440, 1500, 1560, 1620, 1680, 1740, 1800, 1860, 1920, 1980, 2040, 2100, 2160, 2220, 2280, 2340, or 2400 kg/m$^3$). Without limitation, a low density drilling fluid according to this disclosure may have enhanced sag stability and suitable rheology such that it proves particularly applicable in high temperature and/or low ECD applications. In embodiments, a drilling fluid according to this disclosure is a low ECD fluid, adding less than or equal to about 1.5, 1, or 0.5 ppg (180, 120, or 60 kg/m$^3$) due to circulation.

In various embodiments, drilling fluids according to this disclosure are substantially free of organophilic clays and/or organophilic lignite. In some embodiments, an organophilic clay-free drilling fluid according to this disclosure comprises an oleaginous fluid continuous phase, an aqueous fluid internal phase, a surfactant, barite particles or a like weighting agent, and a sag stability enhancer according to this disclosure. As will be apparent to those of skill in the art, a drilling fluid according to this disclosure may comprise additional optional products, such as, without limitation, fluid loss control agents, viscosifiers, thinners, lubricants, etc.

In embodiments, incorporation of the sag stability enhancer in drilling fluids according to this disclosure may not result in a substantial change of the high shear rheological profile of the drilling fluid. As used herein, a substantial change in the rheological profile of the drilling fluid is defined as a 600 rpm rheology measurement increasing by more than about 20% or 25% after incorporation of sag stability enhancer. Stated another way, the incorporation of sag stability enhancer in drilling fluids according to this disclosure may not substantially change the rheological profile of the disclosed drilling fluids by making them become overly viscous. In embodiments, the 600 rpm rheology measurement of a drilling fluid according to this disclosure after hot rolling at 150° F. (65.6° C.) for 16 hours increases by less than or equal to about 12, 11, 10, 9, 8, or 7% relative to the same drilling fluid absent the sag stability enhancer. In embodiments, the 600 rpm rheology measurement of a drilling fluid according to this disclosure after static aging at 350° F. (176.7° C.) for five days increases by less than or equal to about 12, 11, 10, 9, 8, or 7% relative to the same drilling fluid absent the sag stability enhancer. In embodiments, the 300 rpm rheology measurement (i.e., the viscosity in centipoise (cP)) of a drilling fluid according to this disclosure after hot rolling at 150° F. (65.6° C.) for 16 hours increases by less than or equal to about 17, 16, 15, 14, 13, 12, or 11% relative to the same drilling fluid absent the sag stability enhancer. In embodiments, the 300 rpm rheology measurement of a drilling fluid according to this disclosure after static aging at 350° F. (176.7° C.) for five days increases by less than or equal to about 10, 9, 8, 7, or 6% relative to the same drilling fluid absent the sag stability enhancer. In embodiments, a drilling fluid according to this disclosure has a low viscosity, or one that has a viscosity as determined as the reading at 300 rpm measured at 120° F. (48.9° C.) that is less than or equal to about 60, 50, 40, or 30 cP.

In embodiments, the low shear rheological profile of a drilling fluid according to this disclosure is within ±25% of the same drilling fluid absent the sag stability enhancer, as measured by the dial reading at a rotation rate of 6 rpm or less on a Fann Model 35 Viscometer. In embodiments, the 6 rpm rheology measurement of a drilling fluid according to this disclosure after hot rolling at 150° F. (65.6° C.) for 16 hours increases by less than or equal to about 20%, 15%, 10%, 5%, or 0% relative to the same drilling fluid absent the sag stability enhancer. In embodiments, the 6 rpm rheology measurement of a drilling fluid according to this disclosure after static aging at 350° F. (176.7° C.) for five days increases by less than or equal to about 15%, 14%, 13%, 12%, 11%, or 10% relative to the same drilling fluid absent the sag stability enhancer. In embodiments, the 3 rpm rheology measurement of a drilling fluid according to this disclosure after hot rolling at 150° F. (65.6° C.) for 16 hours increases by less than or equal to about 25, 20, 15, 12.5, 10, 5, or 0% relative to the same drilling fluid absent the sag stability enhancer. In embodiments, the 3 rpm rheology measurement of a drilling fluid according to this disclosure after static aging at 350° F. (176.7° C.) for five days increases by less than or equal to about 17%, 16%, 15%, 14%, 13%, 12%, or 11% relative to the same drilling fluid absent the sag stability enhancer.

A drilling fluid according to this disclosure may exhibit a sag factor (discussed further in the Examples hereinbelow)

that is reduced by at least or about 1.5, 1.6, 1.7, 1.8, 1.9, 2.0, 2.1, 2.2, 2.3, or 2.4% relative to a drilling fluid having the same composition absent the sag stability enhancer.

As used herein, the term 'yield point' refers to a parameter of the Bingham plastic model, where yield point refers to the yield stress extrapolated to a shear rate of zero. This extrapolation is commonly made from the highest shear rate readings at 600 and 300 rpm on a Fann 35 rheometer using standard F1 springs. In some embodiments, drilling fluids of this disclosure have yield points after hot rolling at 150° F. (65.6° C.) for 16 hours ranging from about 10 lb/100 ft$^2$ to about 13 lb/100 ft$^2$ (from about 479 Pa to about 622 Pa). In embodiments, drilling fluids according to this disclosure exhibit yield points after static aging at 350° F. (176.7° C.) for five days that are at least or about 5, 6, 7, 8, 9, 10, 11, 12, 13, 14, 15, 16, 17, 18, 19, or 20% higher than the same drilling fluid absent the sag stability enhancer.

As used herein, the term 'gel strength' refers to the shear stress measured at a low shear rate after a drilling fluid has set quiescently for a set period of time. According to standard API procedures, the gel strength is measured after setting for 10 seconds and 10 minutes, although measurements at longer time intervals can also be made such as, for example, 30 minutes or 16 hours. The shear stress is related to the yield stress by the following three-parameter equation:

$$\tau = \tau_0 + k(\gamma)n, \quad (1)$$

where $\tau$ is the shear stress, $\tau_0$ is the yield stress, $k(\gamma)$ is the consistency, and n is a real number. As noted above, k(y) and n are fit graphically or calculated from the 600 and 300 rpm rheometer readings. As used herein, 'yield stress' refers to the torque required to just start a fluid moving from rest in a rheometer measurement. The yield stress is also commonly extrapolated from several viscometer readings at differing shear rates. In rheometer measurements, the yield stress can be approximated by the 3 rpm reading on the standard Fann 35 rheometer. In various embodiments, drilling fluids of the present embodiments have gel strengths ranging from about 5 to about 30 measured after either 10 or 30 minutes of quiescence.

Methods of Use

Also disclosed herein are methods of introducing a drilling fluid according to this disclosure into a wellbore. The methods of the present disclosure may be employed in any subterranean application where a drilling fluid of this disclosure may be suitable. In an embodiment, a method of treating a wellbore comprises providing a drilling fluid according to this disclosure, and using the wellbore fluid during a drilling, drill-in, completions, logging, casing/liner running, abandoning, work-over, or stimulating operation. The drilling fluid may be pumped down to the bottom of a well through a drill pipe, where the fluid emerges through ports in a drill bit, for example. The drilling fluid may be used in conjunction with any drilling operation for which it is suitable, as will be apparent to those of skill in the art. Such drilling operations may include, without limitation, vertical drilling, extended reach drilling, and directional drilling. It will be apparent to those of skill in the art that drilling muds having a variety of formulations may be prepared, with specific formulations depending on the state of drilling a well at a particular time, for example, depending on the particular formation being drilled and/or the depth. The drilling fluids described hereinabove may be adapted, for example, to provide enhanced drilling muds for use under conditions of high temperature and/or having a narrow ECD window. Such high temperature may comprise a temperature ranging from about 100° F. (37.8° C.) to 350° F. (176.7° C.) or greater, or a temperature of at least about 300° F. (148.9° C.), 325° F. (162.8° C.), 350° F. (176.7° C.), or 375° F. (190.6° C.). Drilling muds for use in such elevated temperature applications may be referred to as high temperature drilling muds. A narrow ECD window may comprise an ECD window of less than or equal to about 1.5 ppg, 1 ppg, or 0.5 ppg (i.e., less than or equal to about 180 kg/m$^3$, 120 kg/m$^3$, or 60 kg/m$^3$). Drilling muds for use in such low ECD applications may be referred to as low ECD drilling muds. Low ECD muds must generally have a low viscosity, while providing suitable hole cleaning and sufficient resistance to sag of the weighting agent.

The drilling fluids of the present disclosure may be prepared by any suitable means known in the art. In some embodiments, the drilling fluids may be prepared at a well site or at an offsite location. Once prepared, a drilling fluid of the present disclosure may be placed in a tank, bin, or other container for storage and/or transport to the site where it is to be used. In other embodiments, a drilling fluid of the present disclosure may be prepared on-site, for example, using continuous mixing, on-the-fly mixing, or real-time mixing methods. In certain embodiments, these methods of mixing may include methods of combining two or more components wherein a flowing stream of one element is continuously introduced into flowing stream of another component so that the streams are combined and mixed while continuing to flow as a single stream as part of the on-going treatment. The system depicted in FIG. 1 (described below) may be one embodiment of a system and equipment used to accomplish on-the-fly or real-time mixing.

The methods and compositions of the present disclosure may be used during or in conjunction with any operation in a portion of a subterranean formation and/or wellbore, including but not limited to drilling operations, pre-flush treatments, after-flush treatments, hydraulic fracturing treatments, sand control treatments (e.g., gravel packing), "frac pack" treatments, acidizing treatments (e.g., matrix acidizing or fracture acidizing), wellbore clean-out treatments, cementing operations, workover treatments/fluids, and other operations where such a drilling fluid may be useful. For example, the methods and/or compositions of the present disclosure may be used in the course of drilling operations in which a wellbore is drilled to penetrate a subterranean formation. In certain embodiments, this may be accomplished using the pumping system and equipment used to circulate the drilling fluid in the wellbore during the drilling operation, which is described below.

The drilling fluids of the present disclosure may be provided and/or introduced into the wellbore or used to drill at least a portion of a wellbore in a subterranean formation using any method or equipment known in the art. In certain embodiments, a wellbore fluid of the present disclosure may be circulated in the wellbore using the same types of pumping systems and equipment at the surface that are used to introduce drilling fluids and/or other treatment fluids or additives into a wellbore penetrating at least a portion of the subterranean formation.

The exemplary drilling fluids disclosed herein may directly or indirectly affect one or more components or pieces of equipment associated with the preparation, delivery, recapture, recycling, reuse, and/or disposal of the disclosed drilling fluid. For example, and with reference to FIG. 1, the disclosed drilling fluid may directly or indirectly affect one or more components or pieces of equipment associated with an exemplary wellbore drilling assembly 100, according to one or more embodiments. It should be noted that while FIG. 1 generally depicts a land-based drilling assembly, those skilled in the art will readily recognize that the principles described herein are equally applicable to subsea drilling operations that employ floating or sea-based platforms and rigs, without departing from the scope of the disclosure.

As illustrated, the drilling assembly 100 may include a drilling platform 102 that supports a derrick 104 having a traveling block 106 for raising and lowering a drill string 108. The drill string 108 may include, but is not limited to, drill pipe and coiled tubing, as generally known to those skilled in the art. A kelly 110 supports the drill string 108 as it is lowered through a rotary table 112. A drill bit 114 is attached to the distal end of the drill string 108 and is driven either by a downhole motor and/or via rotation of the drill string 108 from the well surface. As the bit 114 rotates, it creates a borehole 116 that penetrates various subterranean formations 118.

A pump 120 (e.g., a mud pump) circulates drilling fluid 122 through a feed pipe 124 and to the kelly 110, which conveys the drilling fluid 122 downhole through the interior of the drill string 108 and through one or more orifices in the drill bit 114. The drilling fluid 122 is then circulated back to the surface via an annulus 126 defined between the drill string 108 and the walls of the borehole 116. At the surface, the recirculated or spent drilling fluid 122 exits the annulus 126 and may be conveyed to one or more fluid processing unit(s) 128 via an interconnecting flow line 130. After passing through the fluid processing unit(s) 128, a "cleaned" drilling fluid 122 is deposited into a nearby retention pit 132 (i.e., a mud pit). While illustrated as being arranged at the outlet of the wellbore 116 via the annulus 126, those skilled in the art will readily appreciate that the fluid processing unit(s) 128 may be arranged at any other location in the drilling assembly 100 to facilitate its proper function, without departing from the scope of the scope of the disclosure.

One or more of the disclosed components may be added to the drilling fluid 122 via a mixing hopper 134 communicably coupled to or otherwise in fluid communication with the retention pit 132. The mixing hopper 134 may include, but is not limited to, mixers and related mixing equipment known to those skilled in the art. In other embodiments, however, components may be added to the drilling fluid 122 at any other location in the drilling assembly 100. In at least one embodiment, for example, there could be more than one retention pit 132, such as multiple retention pits 132 in series. Moreover, the retention put 132 may be representative of one or more fluid storage facilities and/or units where the disclosed components may be stored, reconditioned, and/or regulated until added to the drilling fluid 122.

As mentioned above, the disclosed drilling fluids may directly or indirectly affect the components and equipment of the drilling assembly 100. For example, the disclosed drilling fluids may directly or indirectly affect the fluid processing unit(s) 128 which may include, but is not limited to, one or more of a shaker (e.g., shale shaker), a centrifuge, a hydrocyclone, a separator (including magnetic and electrical separators), a desilter, a desander, a separator, a filter (e.g., diatomaceous earth filters), a heat exchanger, any fluid reclamation equipment, the fluid processing unit(s) 128 may further include one or more sensors, gauges, pumps, compressors, and the like used store, monitor, regulate, and/or recondition the exemplary drilling fluids.

The disclosed drilling fluids may directly or indirectly affect the pump 120, which representatively includes any conduits, pipelines, trucks, tubulars, and/or pipes used to fluidically convey the drilling fluids downhole, any pumps, compressors, or motors (e.g., topside or downhole) used to drive the drilling fluids into motion, any valves or related joints used to regulate the pressure or flow rate of the drilling fluid, and any sensors (i.e., pressure, temperature, flow rate, etc.), gauges, and/or combinations thereof, and the like. The disclosed drilling fluid may also directly or indirectly affect the mixing hopper 134 and the retention pit 132 and their assorted variations.

The disclosed drilling fluid may also directly or indirectly affect the various downhole equipment and tools that may come into contact with the drilling fluid such as, but not limited to, the drill string 108, any floats, drill collars, mud motors, downhole motors and/or pumps associated with the drill string 108, and any MWD/LWD tools and related telemetry equipment, sensors or distributed sensors associated with the drill string 108. The disclosed drilling fluid may also directly or indirectly affect any downhole heat exchangers, valves and corresponding actuation devices, tool seals, packers and other wellbore isolation devices or components, and the like associated with the wellbore 116. The disclosed drilling fluid may also directly or indirectly affect the drill bit 114, which may include, but is not limited to, roller cone bits, PDC bits, natural diamond bits, any hole openers, reamers, coring bits, etc.

While not specifically illustrated herein, the disclosed drilling fluid may also directly or indirectly affect any transport or delivery equipment used to convey the drilling fluid to the drilling assembly 100 such as, for example, any transport vessels, conduits, pipelines, trucks, tubulars, and/or pipes used to fluidically move the drilling fluid from one location to another, any pumps, compressors, or motors used to drive the drilling fluid into motion, any valves or related joints used to regulate the pressure or flow rate of the drilling fluid, and any sensors (i.e., pressure and temperature), gauges, and/or combinations thereof, and the like.

The invention having been generally described, the following Examples are given as particular embodiments of this disclosure and to demonstrate the practice and advantages thereof. It is to be understood that the Examples are given by way of illustration only, and are not intended to limit the specification or the claims to follow in any manner.

EXAMPLES

Experimental: Preparation of Drilling Fluids and Methods of Making Measurements

Drilling fluid formulations were prepared in accordance with the composition outlined in Table 3 and further described hereinbelow.

TABLE 3

| BASELINE 16.5 PPG (1980 kg/m$^3$) BARAECD ™ FLUID SYSTEM | |
|---|---|
| XP-07 ™ Base Oil, bbl (liters) | 0.52 (82.7) (varies according to desired mud weight) |
| EZ MUL ® NS Emulsifier, lb (kg) | 17.5 (7.9) |
| Lime, lb (kg) | 4 (1.8) |
| CaCl$_2$ Brine, bbl (liters) | 0.06 (9.5): (varies according to desired mud weight) |
| BDF-513 ™ Filtration Control Agent, lb (kg) | 9 (4.1) |
| TAU-MOD ® Viscosifier, lb (kg) | 5 (2.3) |
| BDF-568 ™ Rheology Modifier, lb (kg) | 1 (0.45) |
| BARACARB ® 5 Bridging Agent, | 20 (9.1) |

TABLE 3-continued

BASELINE 16.5 PPG (1980 kg/m³) BARAECD™ FLUID SYSTEM

| lb (kg) | |
| --- | --- |
| Barite Weighting Agent, lb (kg) | 472.3 (214.2) (varies according to desired mud weight) |
| OWR | 90/10 |

The baseline formulation was a BARAECD™ fluid system commercially available from Halliburton Energy Services in Houston, Tex. BARAECD™ is an invert system comprising an oleaginous base fluid. The drilling fluid formulations comprised XP-07™ synthetic paraffin base fluid that is available from Halliburton Energy Services. This drilling fluid thus had a pure normal alkane mixture as the oleaginous fluid continuous phase. As noted in Table 3 hereinabove, in addition to the alkane mixture continuous phase, the experimental drilling fluid further contained a brine internal phase comprising 0.06 bbl $CaCl_2$ brine; EZ MUL® NS or BaraMUL IE-672 emulsifier; BDF-513™ filtration control agent; BDF-568™ rheology modifier; BARACARB® 5 bridging agent, which is a ground marble composition, having $d_{50}$ sizes of 5 microns and 50 microns, respectively; and TAU-MOD® viscosifier, which is an amorphous/fibrous material. The registered and trademarked components are available from Halliburton Energy Services in Houston, Tex.

Mixing was performed on 350 mL quantities of formulated drilling fluid using a Multimixer Model 9585. The indicated amount of oleaginous base fluid was combined with the emulsifier and mixed for 5 minutes, during which time lime was added. At this time, the sample was removed from the mixer, and the brine was added accordingly. Samples were then further mixed for 10 minutes, and filtration control agent was then added with 5 minutes of additional mixing conducted. Calcium carbonate and TAU-MOD® Viscosifier was then added and mixed for 10 minutes. BDF 568™ Rheology Modifier was then added and mixed for 5 minutes. The PEG was then added, with subsequent mixing for an additional 5 minutes. Lastly the barite was added and mixed for 15 minutes. Following mixing, the samples were sheared using a Silverson L4RT high shear mixer equipped with a square hole screen. Silverson shearing was performed at 7000 rpm for 15 minutes. A water bath was maintained around the sample to keep the temperature below 150° F. The sample was then hot rolled for 16 hours at 150° F. (65.6° C.) prior to testing. (Shearing could be performed before or after hot rolling.) Hot rolling is a laboratory technique utilized to simulate downhole circulation at a design temperature for a desired time.

Static aging and density measurements were carried out as outlined below.

After preparation and initial characterization of the drilling fluid formulations, samples were placed in aging cells, and the samples were aged for 5 days (120 hours) at 350° F. (176.7° C.). HPHT Fluid Loss after hot rolling can be measured (according to *API Recommended Practice 13B-2, Recommended Practice for Field Testing of Oil-based Drilling Fluids, Fifth Edition, American Petroleum Institute, August* 2014) on 20 μm (micrometer) ceramic discs at 350° F. (176.7° C.). Generally, HPHT here refers to temperatures of greater than 250° F. (121.1° F.). All testing for sag measurements was performed after static aging for five days at 350° F. (176.7° C.). Measurement of the post-aging density and determination of the sag factor were conducted as follows:

1. Procedure:
   1.1 Transfer one laboratory barrel (350 mL) of drilling fluid into an aging cell;
   1.2 Close the cell properly, pressurize to 100-500 psi with nitrogen and check for leaks;
   1.3 Static age the cell at specified temperature and angle for a specified period of time;
      1.3.1 When aging time is completed, cool down the aging cell to room temperature. Be careful when moving the aging cell to keep the cell in the same angle as it has been aged;
      1.3.2 Carefully bleed off the pressure prior to disassembling the cell;
      1.3.3 Measure amount of liquid separated on top of drilling fluid using syringe and measuring cylinder. Report this as free fluid on top (mL). Then transfer to a Hamilton Beach cup.
2. Sag Testing:
   2.1 Carefully remove the top strata of the mud and fill a tared 100 mL sag/density cup. Tap the cup several times on the bench at intervals as the cup is being filled to dislodge and get rid of entrapped gas. Weigh the top strata and determine the density;
   2.2 Remove the mud from the density cup into the Hamilton Beach cup and clean the sag cup;
   2.3 Continue taking out mud from the cell into the mud cup leaving only the last 100 mL at the bottom of the cell (use the marker to determine the bottom 100 mL). Carefully extrude the bottom layer and observe any stratification or the general state of the mud at the bottom. Mix the bottom layer up in the cell;
   2.4 Transfer the mixed bottom 100 mL mud into the sag/density cup and determine the density;
   2.5 Calculate the Sag Factor according to the equation below.
   2.6 Empty the sag/density cup into the Hamilton Beach cup and mix the composite mud for 10-15 minutes. Preserve the composite sample for other mud properties determination if necessary.
3. Calculations: The stability of the fluid is conventionally characterized by how the fluid segregates and stratifies during the static aging period. The volume of free fluid at the top of the fluid column is measured as well as the density within the segregated and non-segregated fluid layers. The density contrast between top and bottom of the main body of fluid is used to calculate the Sag Factor of the fluid. Ideally, the Sag Factor should remain 0.5 indicating a homogeneous mud body. The Sag Factor described the density contrast within the main body of fluid that underlies any free fluid but does not relate the density and homogeneity of this fluid to the original fluid density.
   3.1 Sag Factor=(Bottom Strata Density)/(Top Strata Density+Bottom Strata Density).

Example 1: Sag Stability of Drilling Fluids Containing Various Barite Sources

Each of the formulations studied, and for which density change measurements are provided in Table 4, contained the same baseline fluid system provided in Table 3, with a different source of barite, and 3 lb/bbl (359.48 kg/m³) of sag stability enhancer comprising PEG with an average molecular weight of about 200 g/mol. The density change measurements after static aging (ASA) for five days at 350° F.

(176.7° C.) for 8 formulations containing a sag stability enhancer of this disclosure, along with the density change measurements determined for baseline formulations containing the same systems absent the PEG 200 are provided in Table 4. As noted above, various micronized barite sources were used in preparing the tested drilling fluid formulations. Formulation 1 contained a fine grind barite having a particle size of about 3 μm. Formulation 2 contained a fine grind barite having a $d_{50}$ of about 3.5 μm. Formulation 3 contained a fine grind barite having a $d_{50}$ of about 4.5 μm. Formulation 4 contained a fine grind barite having a $d_{50}$ of about 2 μm. Formulation 5 contained a fine grind barite having a $d_{50}$ of about 3.25 μm. Formulation 6 contained a fine grind barite having a $d_{50}$ of about 2.5 μm. Formulation 7 contained a fine grind barite having a $d_{50}$ of about 2.7 μm. Formulation 8 contained a fine grind barite having a $d_{50}$ of about 3.0 μm.

TABLE 4

DENSITY CHANGE ASA OF DRILLING FLUIDS CONTAINING VARYING BARITE SOURCES, WITH AND WITHOUT PEG

| FORMULATION: BARITE SOURCE | BASELINE DENSITY CHANGE, PPG (KG/M³) | DENSITY CHANGE OF FORMULATION WITH 3PPB PEG, PPG (KG/M³) |
|---|---|---|
| FORMULATION 1 | 1.29 | 0.76 |
| FORMULATION 2 | 1.59 | 0.72 |
| FORMULATION 3 | 2.34 | 1.2 |
| FORMULATION 4 | 0.73 | 0.28 |
| FORMULATION 5 | 1.94 | 0.68 |
| FORMULATION 6 | 1.34 | 0.97 |
| FORMULATION 7 | 0.63 | 0.44 |
| FORMULATION 8 | 3.2 | 1.05 |

As can be seen from the data in Table 4, incorporation of the sag stability enhancer improved the suspension properties (i.e., reduced the density change) of the drilling fluid for long periods of time (5 days static aging tested) at elevated temperatures (350° F. (176.7° C.) tested). Improvements in sag stability were seen for every barite source tested. The density change upon aging seen in Table 4 is 27.6% to 67.2% less than that seen in the absence of the sag stability enhancer. In applications where a density change of 1.25 lb/gal or less (7.6%) is desired, the usage of the sag stability enhancer of this disclosure enables the use of the barite sources of Formulations 1, 2, 3, 5, 6, and 8, wherein the drilling fluids absent the PEG did not provide a suitably low density change.

Example 2: Sag Stability of Drilling Fluids Containing Various Amounts of Sag Stability Enhancer The rheological properties of drilling fluid formulations based on a fluid system of Table 3, having a baseline density of 16.5 lb/gal (1980 kg/m³), and comprising barite and either 0 lb/bbl (0 kg/m³), 3 lb/bbl (8.6 kg/m³), 4 lb/bbl (11.4 kg/m³), or 5 lb/bbl (14.2 kg/m³) of PEG sag stability enhancer (200 g/mol average molecular weight PEG) were evaluated after aging by hot rolling (AHR) at 66.6° C. (150° F.) for 16 hours, and after static aging (ASA) at 350° F. (176.7° C.) for 5 days. Rheology data was obtained according to *API Recommended Practice 13B-2, Recommended Practice for Field Testing of Oil-based Drilling Fluids, Fifth Edition, American Petroleum Institute, August* 2014, using a FANN® Model 35A direct reading rotational viscometer at 48.9° C. (120° F.) by measuring the shear stress of the bob at shear rates between 3 rpm to 600 rpm (units: lb/100 ft²), determining the plastic viscosity (PV) (units: centipoise (cP)), the yield point (YP) (units: lb/100 ft²), and the low shear yield point (Yz) (units: lb/100 ft²). The PV was determined by subtracting the 300 rpm shear stress from the 600 rpm yield stress. The YP was determined by subtracting the PV from the 300 rpm shear stress. The low shear yield point is determined by multiplying the 3 rpm shear stress reading by two and then subtracting the 6 rpm shear stress.

Rheological data, fluid loss values, density change values, and sag factors for the various formulations, determined as outlined hereinabove, are provided in Table 5 hereinbelow.

TABLE 5

RHEOLOGICAL PARAMETERS, FLUID LOSS, DENSITY CHANGE, AND SAG FACTOR FOR 16.5 PPG (1980 kg/m³) FORMULATION COMPRISING BARITE AND VARIOUS AMOUNTS OF SAG STABILITY ENHANCER

| PEG 200 | NONE | | 3 lb/bbl (8.6 kg/m³) | | 4 lb/bbl (11.4 kg/m³) | | 5 lb/bbl (14.2 kg/m³) | |
|---|---|---|---|---|---|---|---|---|
| Rheology, 120° F. (48.9° C.) | AHR | ASA | AHR | ASA | AHR | ASA | AHR | ASA |
| 600 RPM, lb/100 ft² | 64 | 81 | 70 | 86 | 71 | 86 | 70 | 90 |
| 300 RPM, lb/100 ft² | 36 | 49 | 40 | 53 | 42 | 52 | 41 | 54 |
| 6 RPM, lb/100 ft² | 5 | 10 | 5 | 11 | 6 | 11 | 5.5 | 11.5 |
| 3 RPM, lb/100 ft² | 4 | 9 | 4 | 10 | 5 | 10 | 4.5 | 10.5 |
| PV, cP | 28 | 32 | 30 | 33 | 29 | 34 | 29 | 36 |
| YP lb/100 ft² | 8 | 17 | 10 | 20 | 13 | 18 | 12 | 18 |
| Rheology, 120° F. (48.9° C.) | AHR | ASA | AHR | ASA | AHR | ASA | AHR | ASA |
| Fluid Loss, mL | — | 5.2 | — | 7.0 | — | 8.6 | — | 8.0 |
| Density Change, lb/gal (kg/m³) | — | 1.94 (232.8) | — | 0.68 (81.6) | — | 0.71 (85.2) | — | 0.59 (70.8) |
| Sag Factor | — | 0.526 | — | 0.513 | — | 0.516 | — | 0.513 |

As seen from the data in Table 5, the rheological profile is characteristic of a low ECD fluid, for the baseline and inventive formulations. However, the sag stability after static aging (as indicated by the reduced change in density) improves on average ~60-70%. The high shear rheological profile of drilling fluids according to this disclosure comprising sag stability enhancer exhibit similar high shear rheological profile as the baseline formulation containing no PEG, after static aging. For example, the dial readings at a rotation rate of 600 rpm for the drilling formulations according to this disclosure comprising 3 lb/bbl, 4 lb/bbl, and 5 lb/bbl PEG increase by only 6.2%, 6.2%, and 11.1%, respectively, relative to the baseline formulation, while the dial readings at 300 rpm (i.e., the apparent viscosity of the fluid) increase by only 8.2%, 6.1%, and 10.2%, respectively, relative to the baseline formulation. After static aging, the dial readings at a rotation rate of 6 rpm for the drilling formulations according to this disclosure comprising 3 lb/bbl, 4 lb/bbl, and 5 lb/bbl PEG increase by 10.0%, 10.0%, and 15.0%, respectively, relative to the baseline formulation, while the dial readings at 3 rpm increase by 11.1%, 11.1%, and 16.7%, respectively, relative to the baseline formulation.

Additionally, upon static aging, the densities of the drilling formulations according to this disclosure comprising 3 lb/bbl, 4 lb/bbl, and 5 lb/bbl PEG change by 4.1%, 4.3%, and 3.6%, respectively, while the density of the baseline formulation changes by 11.8%. Thus, the density change of the drilling formulations according to this disclosure comprising 3 lb/bbl, 4 lb/bbl, and 5 lb/bbl PEG change by 64.9%, 63.4%, and 69.6% less, respectively, than the baseline formulation, upon static aging. The plastic viscosity for the drilling formulations according to this disclosure comprising 3 lb/bbl, 4 lb/bbl, and 5 lb/bbl PEG increase by 3.1%, 6.3%, and 12.5%, respectively, after static aging, relative to the baseline formulation, while the yield point increases by 17.6%, 5.9%, and 5.9%, respectively, relative to the baseline formulation. As seen in Table 5, the sag factor of the drilling fluids according to this disclosure, comprising 3 lb/bbl, 4 lb/bbl, and 5 lb/bbl PEG, is also reduced after static aging by about 2.5%, 1.9%, and 2.5%, respectively, relative to the baseline formulation containing no PEG.

The present disclosure is well adapted to attain the ends and advantages mentioned herein, as well as those that are inherent therein. A drilling fluid according to this disclosure may significantly enhance sag stability, which may facilitate economic production and utilization of such drilling fluids, for example by enabling the usage of a greater variety of weighting agents, and/or usage over a wider temperature range and/or range of mud weights. Such drilling fluids may prove especially useful in applications having a narrow ECD window.

The particular embodiments disclosed above are illustrative only, as the present disclosure may be modified and practiced in different but equivalent manners apparent to those skilled in the art having the benefit of the teachings herein. Furthermore, no limitations are intended to the details of construction or design herein shown, other than as described in the claims below. It is therefore evident that the particular illustrative embodiments disclosed above may be altered or modified and all such variations are considered within the scope and spirit of the present disclosure. While compositions and methods are described in terms of "comprising," "containing," or "including" various components or steps, the compositions and methods can also "consist essentially of" or "consist of" the various components and steps. All numbers and ranges disclosed above may vary by some amount. Whenever a numerical range with a lower limit and an upper limit is disclosed, any number and any included range falling within the range is specifically disclosed. In particular, every range of values (of the form, "from about a to about b," or, equivalently, "from approximately a to b," or, equivalently, "from approximately a-b") disclosed herein is to be understood to set forth every number and range encompassed within the broader range of values. Also, the terms in the claims have their plain, ordinary meaning unless otherwise explicitly and clearly defined by the patentee. Moreover, the indefinite articles "a" or "an", as used in the claims, are defined herein to mean one or more than one of the element that it introduces. If there is any conflict in the usages of a word or term in this specification and one or more patent or other documents, the definitions that are consistent with this specification should be adopted.

Embodiments Disclosed Herein Include:

A: A method comprising: providing a drilling fluid that comprises a base fluid; a weighting agent; and a sag stability enhancer, wherein the sag stability enhancer comprises polyethylene glycol (PEG) having a molecular weight of greater than or equal to about 200 g/mol; and placing the drilling fluid in a subterranean formation via a wellbore penetrating the subterranean formation.

B: A method comprising: forming a fluid comprising a base fluid; a weighting agent; and from about 0.5 ppb (1.4 kg/m$^3$) to about 30 ppb (85.5 kg/m$^3$) of a sag stability enhancer, wherein the sag stability enhancer comprises a glycol; and introducing the fluid into at least a portion of a well.

C: A drilling fluid comprising: a base fluid; a weighting agent; and a sag stability enhancer comprising polyethylene glycol (PEG) having a molecular weight of greater than or equal to about 200 g/mol.

Each of embodiments A, B, and C may have one or more of the following additional elements: Element 1: wherein the PEG has a molecular weight in the range of from about 200 to about 20,000 g/mol. Element 2: wherein the sag stability enhancer comprises polyethylene glycol having a molecular weight in the range of from about 200 to about 20,000 g/mol. Element 3: wherein the drilling fluid or fluid comprises less than about 30 ppb (85.5 kg/m$^3$) of the sag stability enhancer. Element 4: wherein the drilling fluid or fluid comprises from about 0.5 ppb (1.4 kg/m$^3$) to about 20 ppb (57.0 kg/m$^3$) of the sag stability enhancer. Element 5: wherein the weighting agent comprises barite. Element 6: wherein the weighting agent has a $d_{50}$ of less than or equal to about 25 μm. Element 7: wherein the base fluid is selected from the group consisting of oil based fluids. Element 8: wherein the drilling fluid or fluid is in the form of an invert emulsion. Element 9: wherein the drilling fluid or fluid comprises a low ECD fluid, designed to add less than about 1.5 ppg (180 kg/m$^3$) density change due to circulation in the wellbore. Element 10: wherein the drilling fluid or fluid has a density in the range of from about 9 ppg (1080 kg/m$^3$) to about 18 ppg (2160 kg/m$^3$). Element 11: wherein the base fluid is a water-based fluid. Element 12: wherein the drilling fluid or fluid exhibits a density change after static aging for at least 120 hours that is at least about 60% less than that of the same drilling fluid absent the sag stability enhancer. Element 13: wherein the drilling fluid or fluid has a density that changes by less than about 5% over at least 120 hours of static aging. Element 14: wherein the drilling fluid or fluid, when compared to a same drilling fluid or fluid without the sag stability enhancer, restricts the increase in plastic viscosity to about 25% or less, and has at least one characteristic selected from the group consisting of: an increased yield point, a reduced density change upon static aging, a reduced sag factor upon static aging, and combinations thereof. Element 15: wherein placing the drilling fluid or fluid in a subterranean formation or introducing the fluid into at least a portion of a well via a wellbore penetrating the subterranean formation further comprises subjecting the drilling fluid or fluid to a temperature of greater than at least about 300° F. (148.9° C.) for a time period of at least 120 hours While preferred embodiments of the invention have been shown and described, modifications thereof can be made by one skilled in the art without departing from the teachings of this disclosure. The embodiments described herein are exemplary only, and are not intended to be limiting. Many variations and modifications of the invention disclosed herein are possible and are within the scope of the invention. Use of the term "optionally" with respect to any element of a claim is intended to mean that the subject element is required, or alternatively, is not required. Both alternatives are intended to be within the scope of the claim.

Numerous other modifications, equivalents, and alternatives, will become apparent to those skilled in the art once the above disclosure is fully appreciated. It is intended that the following claims be interpreted to embrace all such modifications, equivalents, and alternatives where applicable.

What is claimed is:

1. A drilling fluid comprising:
    a base fluid;
    a weighting agent; and
    a sag stability enhancer comprising polyethylene glycol (PEG) having a molecular weight of about 200 g/mol to about 450 g/mol, wherein the base fluid is selected from the group consisting of oil based fluids.

2. The drilling fluid of claim 1 comprising less than about 30 ppb (85.5 kg/m$^3$) of the sag stability enhancer.

3. The drilling fluid of claim 2 comprising from about 0.5 ppb (1.4 kg/m$^3$) to about 20 ppb (57.0 kg/m$^3$) of the sag stability enhancer.

4. The drilling fluid of claim 1, wherein the weighting agent comprises barite.

5. The drilling fluid of claim 4, wherein the weighting agent comprises barite having a $d_{50}$ of less than or equal to about 25 µm.

6. The drilling fluid of claim 1, wherein the drilling fluid is in the form of an invert emulsion.

7. The drilling fluid of claim 1, wherein the drilling fluid exhibits a density change after static aging for at least 120 hours that is at least about 60% less than that of the same drilling fluid absent the sag stability enhancer.

8. The drilling fluid of claim 1, wherein the drilling fluid has a density that changes by less than about 5% over at least 120 hours of static aging.

9. The drilling fluid of claim 1, wherein the drilling fluid, when compared to a same drilling fluid without the sag stability enhancer, restricts the increase in plastic viscosity to about 25% or less, and has at least one characteristic selected from the group consisting of: an increased yield point, a reduced density change upon static aging, a reduced sag factor upon static aging, and combinations thereof.

10. A drilling fluid comprising:
    a base fluid;
    a weighting agent; and
    a sag stability enhancer comprising polyethylene glycol (PEG) having a molecular weight of greater than or equal to about 200 g/mol,
    wherein the drilling fluid comprises a low ECD fluid designed to add less than about 1.5 ppg (180 kg/m$^3$) density change due to circulation.

* * * * *